US005718831A

United States Patent [19]

Zigliotto

[11] Patent Number: 5,718,831

[45] Date of Patent: Feb. 17, 1998

[54] ELECTRICAL CONNECTOR FOR PLASMA ARC CUTTING TORCHES

[75] Inventor: Giuseppe Zigliotto, Longare, Italy

[73] Assignee: Trafimet S.P.A., Vicenza, Italy

[21] Appl. No.: 615,995

[22] Filed: Mar. 18, 1996

[30] Foreign Application Priority Data

Mar. 16, 1995 [IT] Italy ................................ VI950027 U

[51] Int. Cl.$^6$ ................................................ B23K 10/00

[52] U.S. Cl. ................................ 219/121.48; 219/121.39; 219/75; 219/121.54; 439/321

[58] Field of Search ........................ 219/121.48, 121.54, 219/121.36, 121.39, 121.45, 75; 439/321, 308, 306, 305

[56] References Cited

U.S. PATENT DOCUMENTS

| | | | |
|---|---|---|---|
| 4,074,927 | 2/1978 | Ball | 339/89 M |
| 4,550,966 | 11/1985 | Riley | 339/84 |
| 4,645,281 | 2/1987 | Burger | 339/37 |
| 5,145,394 | 9/1992 | Hager | 439/321 |
| 5,328,387 | 7/1994 | Hoffman | 439/469 |
| 5,435,760 | 7/1995 | Miklos | 439/321 |

*Primary Examiner*—Mark H. Paschall

*Attorney, Agent, or Firm*—Vorys, Sater, Seymour and Pease

[57] ABSTRACT

A joint for plasma arc cutting torches comprising a fixed female element, to be applied to the generator, and a movable male element, being connected to the torch, which can be fitted into said fixed element and is provided with a ring (5) which can be screwed on said fixed element, and a sleeve (11) engaging said ring, means (15, 16), which can be disengaged by a tool, being provided for engaging said sleeve in order to prevent its rotation.

5 Claims, 3 Drawing Sheets

ELECTRICAL CONNECTOR FOR PLASMA ARC CUTTING TORCHES

BACKGROUND OF THE INVENTION

1. Field of the Invention

The present innovation provides for a joint for plasma arc cutting torches comprising a fixed female element, to be applied to the generator, and a movable male element, being connected to the torch, which can be fitted into said fixed element and is provided with a ring which can be screwed on said fixed element, wherein said joint comprises a sleeve engaging said ring and some means, which can be disengaged by a tool, engaging said sleeve in order to prevent its rotation.

In particular, the female element comprises a ring to be fixed to the generator which the torch is connected to, and a sleeve, which can freely rotate relative to said fixed element and engage, by means of facets, teeth or the like, the torch ring which is thus made integral, by rotating, with said sleeve.

The joint further comprises a pin, being pressed by a spring, for engaging said sleeve in order to prevent its rotation, it being possible for the user to disengage said pin by means of a tool.

The innovation falls within the field of cutting and welding torches, in particular TIG and plasma torches.

2. Brief Description of the Prior Art

In order to connect the torches to their current generator, standardized joints are used comprising a female threaded element which is fixed to the frame of the generator and into which a male element is fitted being connected to the torch, said male element being then blocked in its position by screwing a threaded ring on the fixed element.

As mentioned above, at present these joints are standardized and they are the same both for TIG-welding torches and for plasma arc cutting torches.

However, this situation is dangerous, since TIG-welding torches operate at relatively low voltage, not higher than 113 peak volts, whereas plasma torches can operate at much higher voltages, reaching even about 400 volts.

It is clear then that the use of a single standardized joint for the two kinds of torches may cause dangerous situations, since the wrong kind of torch may be applied to a joint out of inexperience or by mistake.

Whereas fitting a plasma torch on a TIG joint does not involve particular drawbacks but the non-operation of the equipment, fitting the TIG torch, having low voltage insulation, on a joint for plasma torches through which a much higher voltage is supplied, causes a considerably dangerous situation for the user.

For this reason it is convenient to provide different joints for these two kinds of torches and, in particular, such a joint for plasma torches to exclude the possibility of connecting TIG torches.

Preferably, however, this joint shall be compatible with the ones currently used, in order to make it possible to fit it also on already existing equipment.

Furthermore, this joint may be manufactured by slightly modifying existing dies, without, therefore, having to make some new ones, with a clear advantage for the manufacturing firm.

SUMMARY OF THE INVENTION

The above stated problem is solved by the joint of the innovation, which is characterized by its particular configuration allowing it to be fitted on existing equipment.

Moreover, the joint of the innovation shares a lot of components with the present TIG-plasma joints, thus it being possible to manufacture said components by using the already existing dies.

The present innovation will now be described in detail, by way of non limiting example, with reference to the accompanying drawings in which:

BRIEF DESCRIPTION OF THE DRAWINGS

With reference to FIG. 1, a joint for plasma arc cutting torches according to the innovation comprises a male element, being connected to the torch by means of a cable 2, and a female fixed element 3, which is connected to the generator.

DESCRIPTION OF THE PREFERRED EMBODIMENTS

Figure 1:
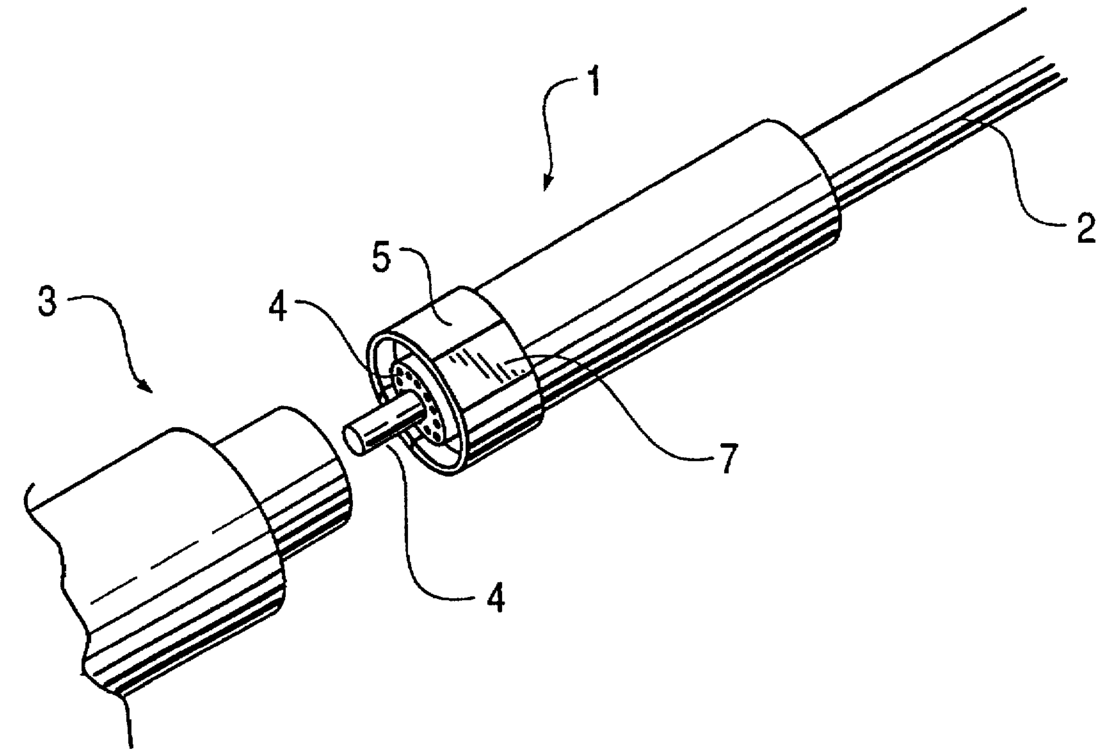
FIG. 1 is a perspective view of a joint for plasma arc cutting torches according to the innovation.

Each element 1 and 3 is provided with a plurality of electrical connectors 4 being connected when male element 1 is fitted into female element 3.

Male element 1 is provided with an inwardly threaded ring 5, which is screwed on a corresponding thread 6 of the fixed element, in order to firmly join elements 1 and 3.

The front of ring 5 has two flat portions 7.

Figure 2:
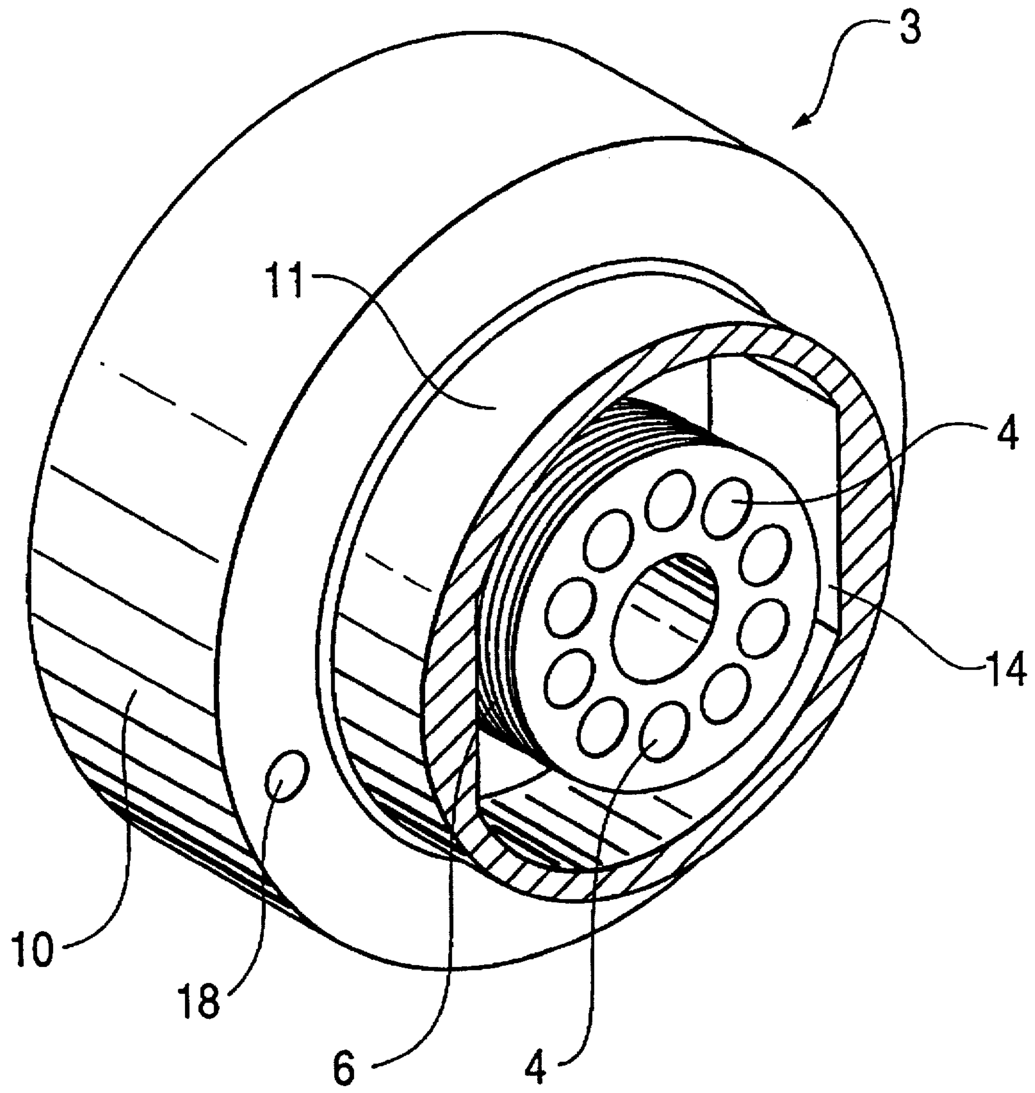
FIG. 2 is a perspective view of the fixed or female element of a joint according to the innovation.
Figure 3:
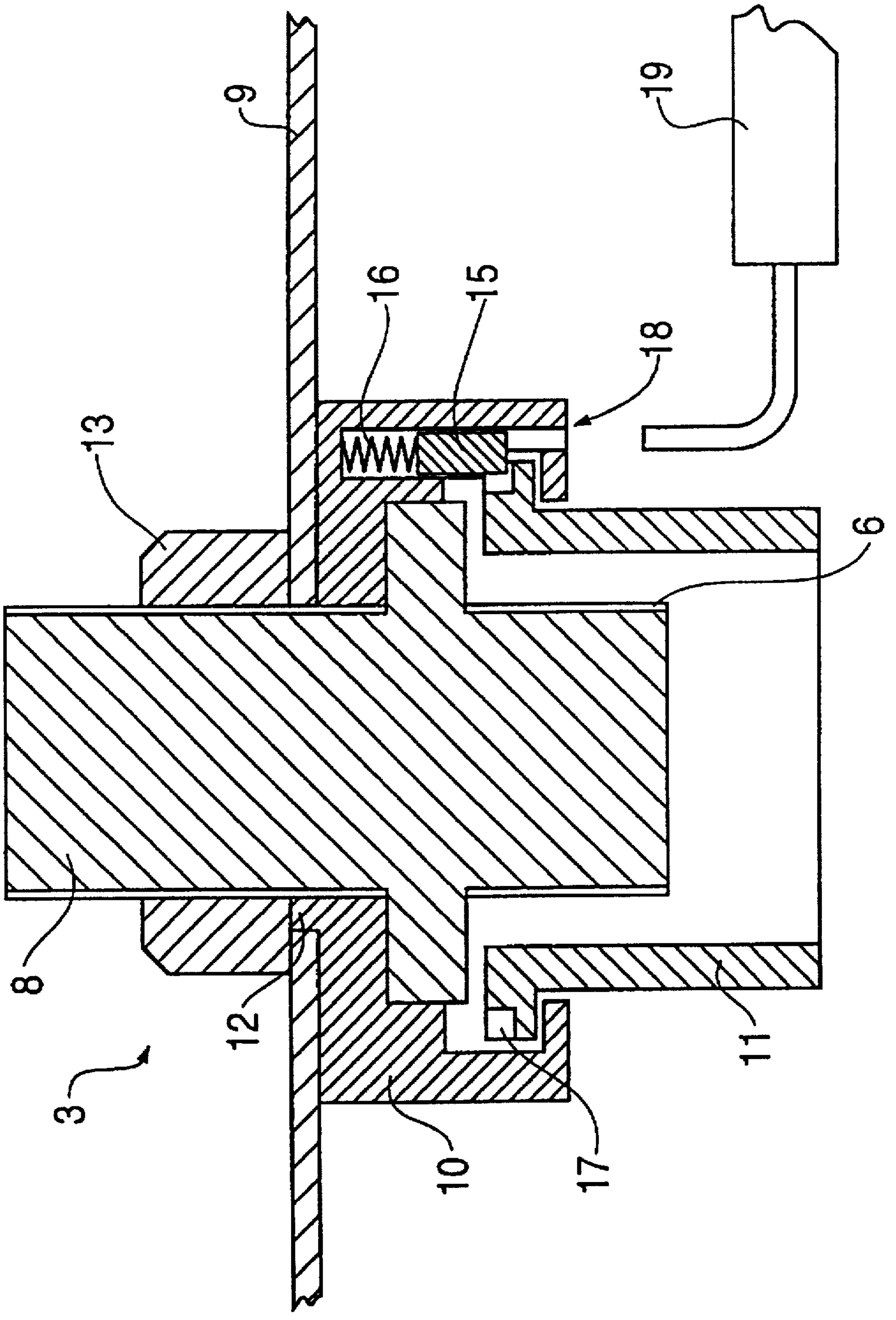
FIG. 3 is a sectional view of the fixed element of a joint as shown in FIG. 2.

With reference to FIGS. 2 and 3, the fixed element 3 of the joint comprises a body 8, which is fitted on the wall 9 of the generator, a ring 10 and a sleeve 11, being coaxial with body 8.

The fixed ring 10 is provided with a tooth 12 which fits into a corresponding seat in the wall 9 of the generator in order to prevent said ring 10 from rotating.

A nut 13, being screwed on a thread of body 8 and tightening against wall 9 and ring 10, blocks the joint in its position.

Sleeve 11, is fitted on ring 10, and may rotate around the axis of the joint and is inwardly provided with a pair of flat walls 14 corresponding to flat portions 7 on ring 5.

When joint element 1 is fitted on female element 3, ring 5 engages sleeve 11 and, as it gets screwed on thread 6, it leads said sleeve 11 into rotation.

Outer ring 10 is provided with a seat through which a pin 15 slides, said pin 15 being pressed by a helical spring 16 to engage teeth 17 on sleeve 11.

Pin 15 projects circumferentially relative to sleeve 11 (see FIG. 3) and the projecting portion is accessible through a hole 18 at the front of ring 10, said hole permitting to insert a tool, such as a point or the like, schematically shown at 19, by which it is possible to operate on pin 15 by pushing it inwards, thus disengaging teeth 17.

The use is as follows.

The joint female element 3 is fitted on the generator, by inserting body 8 into the hole of wall 9, external ring 10 leaning against the wall and tooth 12 fitting inside the provided seat.

Nut 13 is screwed on body 8 and is tightened, thus blocking the whole in position.

In order to connect the torch the user fits the joint male element into fixed element 3, ring 5 penetrating into sleeve 11, flat portions 7 being in contact with sleeve walls 14.

At this point ring 5 and sleeve 11 can slide relative to each other, but they are bound to rotate by the engagement between walls 7 and 14.

Spring 16 presses pin 15, thus fitting it between teeth 17 on the edge of sleeve 11, this way preventing said sleeve and said ring 5 from rotating.

However, in order to fix the two joint elements 1 and 3 and connect them firmly, ring 5 needs to be screwed on thread 6 and, to this purpose, the user must fit tool 19 into hole 18, thus pushing pin 15 back in order to disengage teeth 17 of sleeve 11.

Said sleeve 11 can then rotate freely and, as a consequence, the user can screw ring 5 on thread 6.

As soon as it is released, pin 5 gets back to its former position by engaging teeth 17 again and stopping the rotations of sleeve 11, thus preventing joint element 1 from being removed. In order to remove said element 1 it is necessary to use tool 19 to push pin 15 back and release the sleeve, permitting said sleeve and ring 5 to rotate in the opposite sense, in order to unscrew the ring and disengage it from thread 6.

As mentioned above, this solution offers several advantages.

As a matter of fact, a joint is provided which, though mostly comprising the same components which are currently used for manufacturing TIG joints, and therefore being cheap to produce, offers a high degree of safety, since sleeve 11 with flat walls 14 prevents TIG torch joints from being fitted, said joints lacking flat portions 7.

Furthermore, the need to use a tool for fitting up and removing the movable joint element prevents it from being used by unskilled people.

Different embodiments of the joint may then be included within the scope of the innovation. In particular, the engagement between ring 5 and sleeve 11 may also be performed in some different ways, for example by providing the two elements with projections and cavities respectively, so as to ensure an engagement which permits sliding but prevents the reciprocal rotation of the parts. The dimensions, as well as the materials used, may change according to the requirements of use.

I claim:

1. An electrical connector for a plasma arc cutting torch comprising a fixed female member (3) mountable on a generator, and a movable male member (1) connected to the torch, said male member being capable of being mated with said fixed female member and being provided with a coupling ring (5) capable of being threaded onto said fixed female member, characterized in that said fixed female member is provided with a rotatable sleeve (11) capable of engaging said coupling ring (5), and disengageable means (15, 16) for engaging said sleeve (11) to prevent its rotation.

2. An electrical connector for a plasma arc cutting torch according to claim 1, characterized in that said sleeve (11) is provided with teeth, and said means (15,16) for preventing rotation of said sleeve (11) comprises a pin (15) urged by resilient means (16) to engage said teeth (17) on said sleeve (11).

3. An electrical connector according to claim 2, characterized in that said female member comprises a fixed ring mountable on said generator, said sleeve is coaxially rotatably mounted in said fixed ring, said pin projects axially relative to said sleeve (11), and said fixed ring (10) is provided with a hole (18) aligned with said pin, whereby a tool (19) inserted into said hole can move said pin against force exerted by said resilient means (16), and thereby disengage said pin from said teeth on said sleeve (11).

4. An electrical connector according to claim 1, characterized in that said sleeve (11) on said female member (3) and said coupling ring (5) on said male member have mating configurations, whereby said coupling ring (5) may slide but not rotate relative to said sleeve (11).

5. An electrical connector for a plasma arc cutting torch, said connector having a fixed female member (3) mountable on a generator, and a movable male member (1) connected to the torch, characterized in that it comprises:

- a female member comprising:
  - a body (8) having an axis and an external thread (6) mountable on a housing of a generator (9);
  - a fixed ring (10) integral with said body;
  - a rotatable sleeve (11) mounted inside said fixed ring (10) and capable of rotation around said axis of said body (8);
  - and a pin (15), urged by resilient means (16) to engage teeth (17) on said sleeve (11);

and

- a male member (1) comprising:
  - a coupling ring (5) mounted on said male member (1) and capable of being threaded onto said body of said female member, said coupling ring having means (7) for engaging said rotatable sleeve (11).

* * * * *